US012786814B2

(12) United States Patent
Hong

(10) Patent No.: US 12,786,814 B2
(45) Date of Patent: Nov. 3, 2026

(54) METHOD OF CONTROLLING A TERMINAL AND COMMUNICATION DEVICE

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 362 days.

(21) Appl. No.: 18/579,428

(22) PCT Filed: Jul. 14, 2021

(86) PCT No.: PCT/CN2021/106348
§ 371 (c)(1),
(2) Date: Jan. 15, 2024

(87) PCT Pub. No.: WO2023/283843
PCT Pub. Date: Jan. 19, 2023

(65) Prior Publication Data
US 2024/0340713 A1 Oct. 10, 2024

(51) Int. Cl.
*H04W 36/00* (2009.01)
*H04L 5/00* (2006.01)
*H04W 76/20* (2018.01)

(52) U.S. Cl.
CPC ....... *H04W 36/0064* (2023.05); *H04L 5/0053* (2013.01); *H04W 36/0058* (2018.08); *H04W 76/20* (2018.02)

(58) Field of Classification Search
CPC ..... H04W 24/02; H04W 92/20; H04W 36/00; H04W 36/0033; H04W 36/08
See application file for complete search history.

(56) References Cited

U.S. PATENT DOCUMENTS

2017/0311208 A1* 10/2017 Yu .................. H04W 36/00692
2019/0297551 A1 9/2019 Wang et al.
2019/0380066 A1 12/2019 Sharma et al.
2020/0169923 A1 5/2020 Liu
(Continued)

FOREIGN PATENT DOCUMENTS

CN 103546980 A 1/2014
CN 104581810 A 4/2015
CN 107041016 A 8/2017
(Continued)

OTHER PUBLICATIONS

State Intellectual Property Office of the People's Republic of China, Office Action and Search Report Issued in Application No. 2021800020639, Jun. 13, 2025, 23 pages.(Submitted with Machine/Partial Translation).
(Continued)

*Primary Examiner* — Mahran Y Abu Roumi
(74) *Attorney, Agent, or Firm* — Volpe Koenig

(57) ABSTRACT

A method, apparatus and computer readable medium for improving a wireless communication system. The wireless communication system is improved by: receiving a handover request acknowledgement message from a second network device, sending control information to the terminal to control the terminal, wherein the control information indicates a control action corresponding to a type of the second network device.

18 Claims, 4 Drawing Sheets

(56) References Cited

U.S. PATENT DOCUMENTS

2021/0168674 A1 6/2021 He et al.

FOREIGN PATENT DOCUMENTS

| | | | |
|---|---|---|---|
| CN | 110050483 | A | 7/2019 |
| CN | 112789894 | A | 5/2021 |
| EP | 3713369 | A1 | 9/2020 |
| WO | 2009086787 | A1 | 7/2009 |
| WO | 2019/024108 | A1 | 2/2019 |

OTHER PUBLICATIONS

ISA State Intellectual Property Office of the People's Republic of China, Written Opinion of the International Searching Authority Issued in Application No. PCT/CN2021/106348, Apr. 13, 2022, WIPO, 7 pages.

ISA State Intellectual Property Office of the People's Republic of China, International Search Report Issued in Application No. PCT/CN2021/106348, Apr. 13, 2022, WIPO, 4 pages.

ZTE. "Clarification on the N2 handover and 5GS to EPS handover for SNPN",3GPP TSG-SA WG2 Meeting #134 S2-1907740, Jun. 28, 2019 , 8 pages.

* cited by examiner

METHOD OF CONTROLLING A TERMINAL AND COMMUNICATION DEVICE

CROSS REFERENCE TO RELATED APPLICATIONS

This application is a National Stage of International Application No. PCT/CN2021/106348, filed on Jul. 14, 2021, the disclosure of which is incorporated herein by reference in its entirety for all purposes.

TECHNICAL FIELD

The present disclosure relates to the field of mobile communication technologies, and in particular, to methods of controlling a terminal and communication devices.

BACKGROUND

With the development of wireless communication, the functions of a terminal such as a mobile phone are becoming more and more powerful. In addition, with the development of society, there are different requirements for actions of the terminal in different scenarios. For example, in public places such as subways and libraries, to broadcast the sound of a mobile phone is not approved.

SUMMARY

According to a first aspect of embodiments of the present disclosure, there is provided a method of controlling a terminal, which is performed by a first network device, wherein the first network device is a network device that currently provides services to the terminal. The method comprises: in response to receiving a handover request acknowledgement message from a second network device, sending control information to the terminal to control the terminal, where the control information indicates a control action corresponding to a type of the second network device.

According to a second aspect of embodiments of the present disclosure, there is provided a method of controlling a terminal, which is performed by a terminal and comprises: receiving control information sent by a first network device, wherein the first network device is a network device that currently provides services for the terminal, and the control information indicates a control action corresponding to a type of a second network device to which the terminal is to perform a handover, and based on the control information, performing a handover to the second network device and performing the control action.

According to a third aspect of embodiments of the present disclosure, there is provided a method of controlling a terminal, which is performed by a second network device to which the terminal is to perform a handover and comprises: sending type information to a first network device, wherein the first network device is a network device that currently provides services for the terminal, and the type information indicates a type of the second network device.

Additional aspects and advantages of the present disclosure will be partially given in the following descriptions and will partially become apparent from the following descriptions or will be understood through the practice of the present disclosure.

BRIEF DESCRIPTION OF DRAWINGS

The above and/or additional aspects and advantages of the present disclosure will become apparent and easily understood from the following descriptions of embodiments in conjunction with the accompanying drawings, wherein.

DETAILED DESCRIPTION

Figure 1:
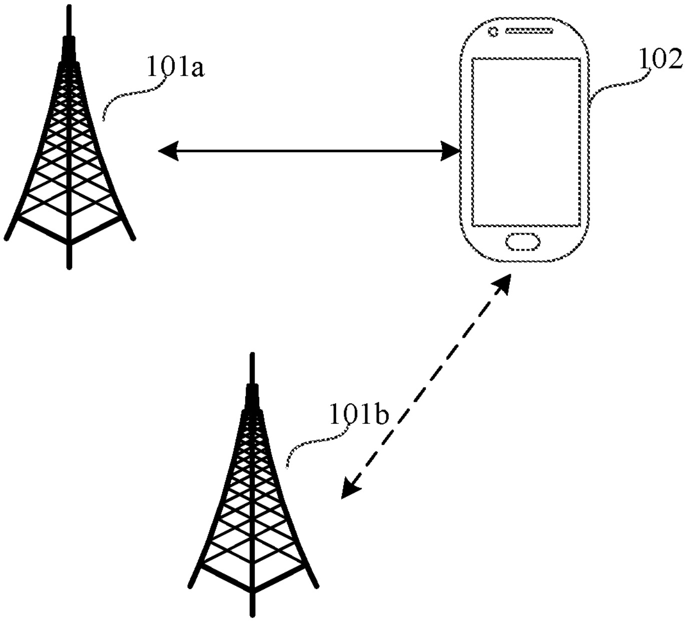
FIG. 1 is a schematic architecture diagram illustrating a communication system according to an embodiment of the present disclosure.

The embodiments of the present disclosure will be described below in details with examples thereof shown in the accompanying drawings, and the same or similar reference numerals represent same or similar elements or elements having same or similar functions throughout the specification. Furthermore, the embodiments described below by referring to the accompanying drawings are merely illustrative to explain the present disclosure rather than limit the present disclosure.

In order to better understand the method and apparatus of controlling a terminal disclosed in the embodiments of the present disclosure, a communication system to which the embodiments of the present disclosure are applicable will be first described below.

Referring to FIG. 1, FIG. 1 is a schematic architecture diagram illustrating a communication system according to an embodiment of the present disclosure. The communication system may include, but is not limited to, a network device and a terminal. In the embodiments of the present disclosure, a number and form of devices shown in FIG. 1 are only for example and do not intent to make limitations. In practical application, the communication system may include two or more network devices and two or more terminals. The communication system shown in FIG. 1 includes two network devices 101*a*-101*b* and one terminal 102 as an example.

It should be noted that the technical solutions of embodiments of the present disclosure can be applied to various communication systems, for example, a long term evolution (LTE) system, a 5th generation (5G) mobile communication system, a 5G new radio (NR) system, or other future new mobile communication systems.

In an embodiment of the present disclosure, the network device 101 (101*a*, 101*b*) is an entity for transmitting or receiving signals on a network side. For example, the network device 101 may be an evolved base station (evolved NodeB, eNB), a transmission point (transmission reception point, TRP), a next generation base station in an NR system (next generation NodeB, gNB), a base station in other future mobile communication systems or an access node in wireless fidelity (WiFi) systems, etc. In the embodiments of the present application, the specific technologies and the specific device form adopted by the network device are not limited. The network device provided by the embodiment of the present application may comprise a central unit (CU) and one or more distributed units (DUs), wherein the CU may also be referred to as a control unit. The CU-DU structure may divide functions of the network device. For example, protocol layers of the base station are divided, where the functions of part of the protocol layers are centrally controlled by the CU, and the functions of part or all of the remaining protocol layers are distributed in the DUs, and the DUs are centrally controlled by the CU. In FIG. 1, the network device 101*a* may represent a source network device that currently provides services to a terminal 102, and the network device 101*b* may represent a target network device to which the terminal 102 is to perform a handover. That is, the terminal 102 may be switched from the network device 101*a* to the network device 101*b*.

The terminal 102, in the embodiment of the present application, is an entity for receiving or transmitting signals on a user side, such as a mobile phone. The terminal may also be referred to as user equipment (UE), a mobile station (MS), or a mobile terminal (MT), etc. The terminal may be a car with communication functions, a smart car, a mobile phone, a wearable device, a tablet computer (Pad), a computer with wireless transceiving functions, a virtual reality (VR) terminal, an augmented reality (AR) terminal, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like. The embodiments of the present application do not limit the specific technologies and the specific device form adopted by the terminal.

It can be understood that the communication system is described in the embodiments of the present application to illustrate the technical solution of the embodiments of the present application more clearly, and not to limit the technical solution provided in the embodiments of the present application. It is known to those of ordinary skill in the art that, with the evolution of system architecture and the emergence of new service scenarios, the technical solution provided in the embodiments of the present application is also applicable to solving similar technical problems.

With the development of wireless communication, functions of the terminal, such as a mobile phone, are becoming more and more powerful. In addition, with the development of society, there are different requirements for the actions of the terminal in different scenarios. For example, in public places such as the subway, to broadcast the sound of the mobile phone is not approved.

In order to control a terminal to perform a response action in different occasions, the present disclosure provides a method and an apparatus of controlling a terminal, where a type of a network device to which the terminal is to perform a handover is confirmed, and control information is sent to the terminal based on the type, so as to instruct the terminal to perform a control action corresponding to the type, thereby implementing control over the terminal.

The method and apparatus of controlling a terminal provided by the present application are described in detail below in combination with accompanying drawings.

Figure 2:
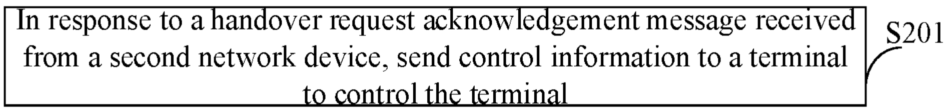
FIG. 2 is a schematic flowchart illustrating a method of controlling a terminal according to an embodiment of the present disclosure.

FIG. 2 is a schematic flowchart illustrating a method for controlling a terminal according to an embodiment of the present disclosure. As shown in FIG. 2, the method may be performed by a first network device, wherein the first network device is a network device that currently provides services to the terminal, and can also be referred to as a source network device. The method according to the embodiment may include following steps.

Step S201: in response to a handover request acknowledgement message received from a second network device, control information is sent to the terminal to control the terminal, where the control information indicates a control action corresponding to a type of the second network device.

The second network device may also be referred to as a target network device which provides services to the terminal after the terminal completes the handover.

The second network device may be, for example, classified into a subway base station, a high-speed railway base station, and the like according to the application scenarios, or classified into a base station requiring to mute a device, a base station allowing a device to broadcast sound and the like according to the implementation requirements. Of course, it should be understood that other types of the second network device are also possible according to requirements. In addition, the types of the first network device and the second network device may be different or the same.

In response to the handover request acknowledgement (Handover Request Acknowledge) message received from the second network device, the first network device may notify the terminal of a control action corresponding to the type of the second network device, so that the terminal can perform the corresponding control action.

The control action may include, for example, muting, unmuting, switching to a vibration mode, turning on a sound broadcasting mode, and the like.

Based on the method of controlling a terminal according to an embodiment of the present disclosure, after the first network device currently providing services to the terminal receives a handover request acknowledgement message from the second network device, the first network device sends control information indicating a control action corresponding to a type of the second network device to the terminal, so as to control the terminal. Therefore, by sending the control information to the terminal based on a type of a network device to which the terminal is to perform a handover, it can instruct the terminal to perform a control action corresponding to the type, thereby realizing control of the terminal.

Figure 3:
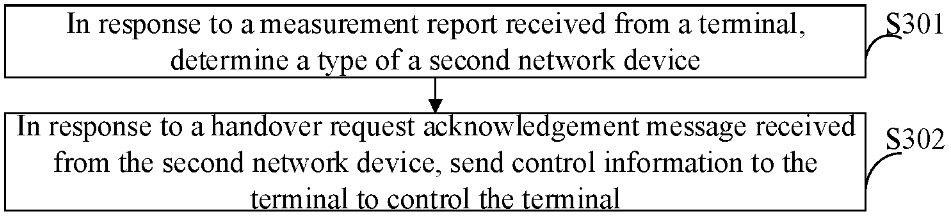
FIG. 3 is a schematic flowchart illustrating a method of controlling a terminal according to an embodiment of the present disclosure.

FIG. 3 is a schematic flowchart illustrating a method of controlling a terminal according to an embodiment of the present disclosure. As shown in FIG. 3, the method may be performed by a first network device, wherein the first network device is a network device that currently provides services to the terminal, and may also be referred to as a source network device. The method according to the present embodiment may include following steps.

Step 301: in response to a measurement report received from a terminal, a type of a second network device is determined, where the terminal is to perform a handover to the second network device.

In the embodiment, when the first network device receives a measurement report from the terminal which is in a connected state, the first network device may determine the type of the second network device to which the terminal is to perform a handover. The second network device may also be referred to as a target network device that provides services to the terminal after the terminal completes the handover.

The second network device may be, for example, classified into a subway base station, a high-speed railway base station, and the like according to the application scenarios, or classified into a base station requiring to mute a device, a base station allowing a device to broadcast sound and the like according to the implementation requirements. Of course, it should be understood that other types of the second network device are also possible according to requirements. In addition, the types of the first network device and the second network device may be different or the same.

Step S302: in response to a handover request acknowledgement message received from the second network device, control information is sent to the terminal to control the terminal, where the control information indicates a control action corresponding to the type of the second network device.

If the first network device has confirmed the type of the second network device and has received a handover request acknowledgement (Handover Request Acknowledge) message from the second network device, the first network device may notify the terminal of a control action corresponding to the type of the second network device, so that the terminal can perform the corresponding control action.

The control action may include, for example, muting, unmuting, switching to a vibration mode, turning on a sound broadcast mode, and the like.

Based on the method of controlling a terminal according to an embodiment of the present disclosure, the first network device that currently provides services for the terminal determines a type of the second network device to which the terminal is to perform a handover, in response to a measurement report received from the terminal. And after receiving a handover request acknowledgement message from the second network device, the first network device sends control information to the terminal to control the terminal. Therefore, by confirming the type of the network device to which the terminal is to perform a handover, and sending the control information to the terminal based on the type, it can instruct the terminal to perform a control action corresponding to the type, thereby realizing control of the terminal.

Figure 4:
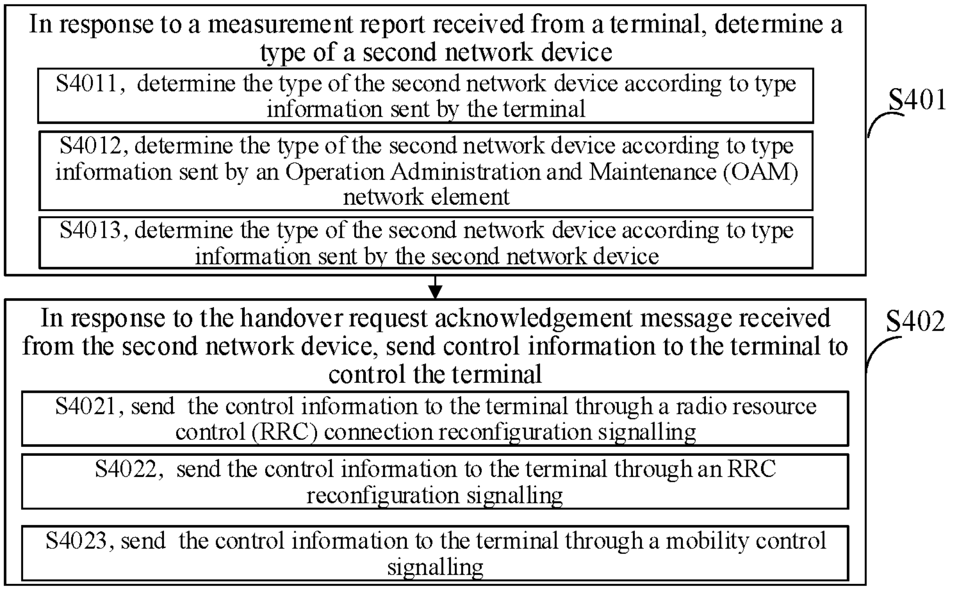
FIG. 4 is a schematic flowchart illustrating a method of controlling a terminal according to an embodiment of the present disclosure.

FIG. 4 is a schematic flow chart illustrating a method of controlling a terminal according to an embodiment of the present disclosure. As shown in FIG. 4, the method may be performed by a first network device, where the first network device is a network device that currently provides services for the terminal, and may also be referred to as a source network device. The method according to the present embodiment may include following steps.

Step S401: in response to a measurement report received from a terminal, a type of a second network device is determined, where the terminal is to perform a handover to the second network device.

In the embodiment, when the first network device receives a measurement report from the terminal which is in a connected state, the first network device may determine the type of the second network device to which the terminal is to perform a handover. The second network device may also be referred to as a target network device that provides services to the terminal after the terminal completes the handover.

The second network device may be, for example, classified into a subway base station, a high-speed railway base station, and the like according to the application scenarios, or classified into a base station requiring to mute a device, a base station allowing to a device to broadcast sound and the like according to the implementation requirements. Of course, it should be understood that other types of the second network device are also possible according to requirements. In addition, the types of the first network device and the second network device may be different or the same.

In some embodiments, step S401 may be performed by at least one of the following.

Step S4011: the type of the second network device is determined according to type information sent by the terminal, where the type information indicates the type of the second network device.

In the embodiment, the terminal may notify the type of the second network device to the first network device while sending the measurement report. For example, when the terminal sends the measurement report to the first network device, the measurement report may carry information about the type of the second network device to which the terminal is to perform a handover. And after receiving the measurement report, the first network device may determine the type of the second network device according to the information carried by the measurement report.

Step S4012: the type of the second network device is determined according to type information sent by an Operation Administration and Maintenance (OAM) network element, where the type information indicates the type of the second network device.

In the embodiment, the type of the second network device may be notified to the first network device by an Operation Administration and Maintenance (OAM) network element. The OAM network element can realize the analysis, prediction, planning and configuration of daily communication networks and services, and testing and fault management of the communication networks and their services. The information about the type of the second network device to which the terminal is to perform a handover can be sent to the first network device through the OAM network element, and the first network device can determine the type of the second network device according to the information.

Step S4013: the type of the second network device is determined according to type information sent by the second network device, where the type information indicates the type of the second network device.

In the embodiment, the type of the second network device may be notified to the first network device by the second network device itself. The second network device may send information about its type to the first network device, and the first network device may determine the type of the second network device according to the information.

In some embodiments, the second network device sends the type information to the first network device by at least one of: an X2 Setup Request signalling; an X2 Setup Response signalling; an XN Setup Request signalling; an XN Setup Response signalling; or a handover request acknowledgement message.

In some embodiments, the second network device may send the type information to the first network device for subsequent use when an interface with the first network device is established.

In particular, if the current communication system is an Evolved UMTS Terrestrial Radio Access Network (E-Utran) system, the second network device may send the type information to the first network device through an X2 Setup Request signalling or an X2 Setup Response signalling. The first network device may determine the type of the second network device according to the type information when needed.

If the current communication system is a New Radio (NR) system, the second network device may send the type information to the first network device through an XN Setup Request signalling or an XN Setup Response signalling. The first network device may determine the type of the second network device based on the type information when needed.

In some embodiments, the second network device may send the type information to the first network device in a handover process of the terminal.

Specifically, the second network device may send the type information to the first network device by carrying the type information in the handover request acknowledgement message. After receiving the handover request acknowledgement message, the first network device may determine the type of the second network device according to the type information carried in the handover request acknowledgement message.

Step S402: In response to the handover request acknowledgement message received from the second network device, control information is sent to the terminal to control the terminal, where the control information indicates a control action corresponding to the type of the second network device.

In response to confirming the type of the second network device and receiving the handover request acknowledgement (Handover Request Acknowledge) message from the second network device, the first network device may notify the terminal of a control action corresponding to the type of the second network device to enable the terminal to perform the corresponding control action.

The control action may include, for example, muting, unmuting, switching to a vibration mode, turning on a sound broadcast mode, and the like.

In some embodiments, step S402 may be performed by at least one of the following.

Step S4021: the control information is sent to the terminal through a radio resource control (RRC) connection reconfiguration (RRC Connection Reconfiguration) signalling.

In this embodiment, when the current communication system is an E-UMTS system, the first network device may send the control information to the terminal through the RRC connection reconfiguration signalling, so that the terminal may access the second network device and perform a corresponding control action according to the control information.

Step S4022: the control information is sent to the terminal through an RRC reconfiguration (RRC Reconfiguration) signalling.

In this embodiment, when the current communication system is an NR system, the first network device may send the control information to the terminal through the RRC reconfiguration signalling, so that the terminal may access the second network device and perform a corresponding control action according to the control information.

Step S4023: the control information is sent to the terminal through a mobility control signalling.

In this embodiment, the first network device may send the control information to the terminal through the mobility control (Mobility Control Info) signalling, so that the terminal may access the second network device and perform a corresponding control action according to the control information.

Based on the method of controlling a terminal according to an embodiment of the present disclosure, a first network device that currently provides services for the terminal determines a type of a second network device to which the terminal is to perform a handover, in response to a measurement report received from the terminal. And after receiving a handover request acknowledgement message from the second network device, the first network device sends control information to the terminal to control the terminal. Therefore, by confirming the type of the network device to which the terminal is to perform a handover, and sending the control information to the terminal based on the type, it can instruct the terminal to perform a control action corresponding to the type, thereby realizing control of the terminal.

Figure 5:
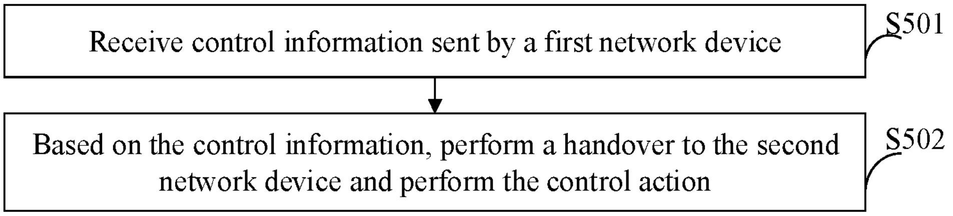
FIG. 5 is a schematic flowchart illustrating a method of controlling a terminal according to an embodiment of the present disclosure.

FIG. 5 is a schematic flowchart illustrating a method of controlling a terminal according to an embodiment of the present disclosure. As shown in FIG. 5, the method may be performed by a terminal and comprises following steps.

Step S501: control information sent by a first network device is received, where the first network device is a network device that currently provides services to the terminal, and the control information indicates a control action corresponding to a type of a second network device to which the terminal is to perform a handover.

In this embodiment, after the first network device confirms the type of the second network device and receives a handover request acknowledgement (Handover Request Acknowledge) message from the second network device, the first network device may notify the terminal of a control action corresponding to the type of the second network device. The first network device may also be referred to as a source network device. The second network device may also be referred to as a target network device that provides services to the terminal after the terminal completes the handover.

The second network device may be, for example, classified into a subway base station, a high-speed railway base station, and the like according to the application scenarios, or classified into a base station requiring to mute a device, a base station allowing a device to broadcast sound and the like according to the implementation requirements. Of course, it should be understood that other types of the second network device are also possible according to requirements. In addition, the types of the first network device and the second network device may be different or the same.

The control action may include, for example, muting, unmuting, switching to a vibration mode, turning on a sound broadcast mode, and the like.

In some embodiments, the terminal receives the control information from the first network device by at least one of: a radio resource control (RRC) connection reconfiguration signalling; an RRC reconfiguration signalling; or a mobility control signalling.

In particular, if the current communication system is an Evolved UMTS Terrestrial Radio Access Network (E-Utran)

system, the terminal may receive the control information from the first network device through an RRC connection reconfiguration signalling.

If the current communication system is a New Radio (NR) system, the terminal may receive the control information from the first network device through an RRC reconfiguration signalling.

In addition, the terminal may further receive the control information from the first network device through a mobility control (Mobility ControlInfo) signalling.

Step S502: based on the control information, the terminal performs a handover to the second network device and executes the control action.

After receiving the control information, the terminal may access the second network device, and complete a handover process, and perform the control action indicated by the control information.

Based on the method of controlling a terminal according to an embodiment of the present disclosure, the terminal receives the control information from the first network device that currently provides services for the terminal, wherein the control information indicates a control action corresponding to a type of a second network device to which the terminal is to perform a handover, and the terminal performs a handover to the second network device and performs the control action based on the control information. Therefore, according to the control information that indicates the control action corresponding to the type of the network device to which the terminal is to perform a handover, the terminal can perform the control action corresponding to the type, thereby realizing control of the terminal.

Figure 6:
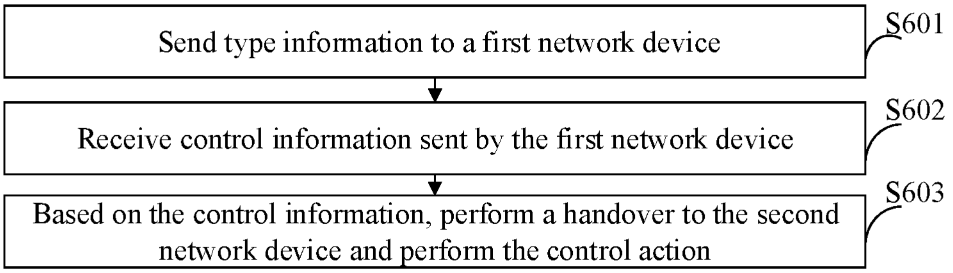
FIG. 6 is a schematic flowchart illustrating a method of controlling a terminal according to an embodiment of the present disclosure.

FIG. 6 is a flowchart illustrating a method of controlling a terminal according to an embodiment of the present disclosure. As shown in FIG. 6, the method may be performed by a terminal and comprises following steps.

Step S601: type information is sent to a first network device, where the first network device is a network device that currently provides services to the terminal, and the type information indicates a type of a second network device to which the terminal is to perform a handover.

In this embodiment, the terminal may notify the first network device of the type of the second network device while sending the measurement report. For example, when the terminal sends the measurement report to the first network device, the measurement report may carry information about the type of the second network device to which the terminal is to perform a handover. And after receiving the measurement report, the first network device may determine the type of the second network device according to the information carried by the measurement report.

Step S602: control information sent by the first network device is received, where the control information indicates a control action corresponding to the type of the second network device.

Step S603: based on the control information, the terminal performs a handover to the second network device and executes the control action.

For the specific details of the above steps S602-S603, reference may be made to the related description of steps S501-S502 in the embodiment of FIG. 5, which will not be repeated here.

Based on the method of controlling a terminal according to an embodiment of the present disclosure, the terminal may send the type information that indicates the type of the second network device to which the terminal is to perform a handover, to the first network device that currently provides services for the terminal, so that the first network device can determine the type of the second network device. And the terminal receives the control information from the first network device, wherein the control information indicates the control action corresponding to the type of the second network device. The terminal performs a handover to the second network device and performs the control action based on the control information. Therefore, according to the control information that indicates the control action corresponding to the type of the network device to which the terminal is to perform a handover, the terminal can perform the control action corresponding to the type, thereby realizing control of the terminal.

Figure 7:
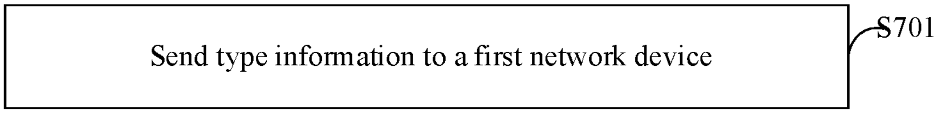
FIG. 7 is a schematic flowchart illustrating a method of controlling a terminal according to an embodiment of the present disclosure.

FIG. 7 is a schematic flowchart illustrating a method of controlling a terminal according to an embodiment of the present disclosure. As shown in FIG. 7, the method may be performed by a second network device to which the terminal is to perform a handover. The method according to the present embodiment may comprise following steps.

Step S701: type information is sent to a first network device, where the first network device is a network device that currently provides services to the terminal, and the type information indicates a type of the second network device.

The first network device may also be referred to as a source network device. The second network device may also be referred to as a target network device that provides services to the terminal after the terminal completes a handover.

The second network device may be, for example, classified into a subway base station, a high-speed railway base station, and the like according to the application scenarios, or classified into a base station requiring to mute a device, a base station allowing a device to broadcast sound and the like according to the implementation requirements. Of course, it should be understood that other types of the second network device are also possible according to requirements. In addition, the types of the first network device and the second network device may be different or the same.

The control action may include, for example, muting, unmuting, switching to a vibration mode, turning on a sound broadcast mode, and the like.

In this embodiment, the type of the second network device may be notified to the first network device by the second network device itself. The second network device may send information about its type to the first network device, and the first network device can determine the type of the second network device according to the information.

In some embodiments, the second network device sends the type information to the first network device by at least one of: an X2 Setup Request signalling; an X2 Setup Response signalling; an XN Setup Request signalling; an XN Setup Response signalling; or a handover request acknowledgement message.

In some embodiments, the second network device may send the type information to the first network device for subsequent use when an interface with the first network device is established.

In particular, if the current communication system is an Evolved UMTS Terrestrial Radio Access Network (E-Utran) system, the second network device may send the type information to the first network device through an X2 Setup Request signalling or an X2 Setup Response signalling. The first network device may determine the type of the second network device according to the type information when needed.

If the current communication system is a New Radio (NR) system, the second network device may send the type information to the first network device through an XN Setup Request signalling or an XN Setup Response signalling. The first network device may determine the type of the second network device based on the type information when needed.

In some embodiments, the second network device may send the type information to the first network device in a handover process of the terminal.

Specifically, the second network device may send the type information to the first network device by carrying the type information in the handover request acknowledgement message. After receiving the handover request acknowledgement message, the first network device may determine the type of the second network device according to the type information carried in the handover request acknowledgement message.

Based on the method of controlling a terminal according to an embodiment of the present disclosure, the second network device may send the information about its type to the first network device, so that the first network device can determine the type of the second network device when needed. Therefore the terminal can be controlled based on the type of the second network.

In the above embodiments provided by the present application, the methods provided by the embodiments of the present application are introduced from the perspectives of network device and terminal, respectively. In order to implement each function in the methods provided by the embodiments of the present application, the network device and the terminal may include hardware structures and software modules. The above functions are implemented in the form of the hardware structures, the software modules, or the hardware structures plus the software module. Any one of the above functions may be performed in hardware structures, software modules, or a combination of hardware structures and software modules.

Corresponding to the methods of controlling a terminal provided in the foregoing embodiments, the embodiments of the present disclosure further provide an apparatus for controlling a terminal. Since the apparatus of controlling a terminal provided in the embodiments of the present disclosure corresponds to the methods of controlling the terminal according to the foregoing embodiments, the implementation of the methods of controlling the terminal is also applicable to the apparatus of controlling the terminal provided in the embodiments, and will not be further described in detail in the embodiments.

Figure 8:
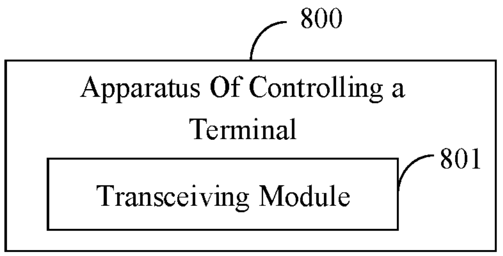
FIG. 8 is a structural schematic diagram illustrating an apparatus for controlling a terminal according to an embodiment of the present disclosure.

FIG. 8 is a structural schematic diagram illustrating an apparatus for controlling a terminal according to an embodiment of the present disclosure. The apparatus may be applied to a first network device, where the first network device is a network device that currently provides services to the terminal.

As shown in FIG. 8, the apparatus 800 may include a transceiving module 801.

The transceiving module 801 may be configured to send control information to the terminal in response to a handover request acknowledgement message received from a second network device to control the terminal, where the control information indicates a control action corresponding to a type of the second network device.

Based on the apparatus of controlling a terminal according to an embodiment of the present disclosure, the first network device that currently provides services for the terminal determines a type of the second network device to which the terminal is to perform a handover in response to a measurement report received from the terminal. And after receiving a handover request acknowledgement message from the second network device, the first network device sends control information to the terminal to control the terminal. Therefore, by confirming the type of the network device to which the terminal is to perform a handover, and sending the control information to the terminal based on the type, it can instruct the terminal to perform a control action corresponding to the type, thereby realizing control of the terminal.

Figure 9:
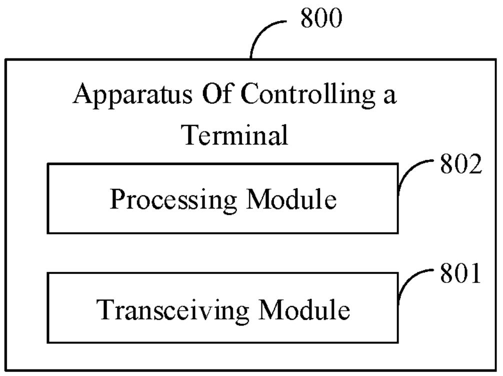
FIG. 9 is a structural schematic diagram illustrating an apparatus for controlling a terminal according to an embodiment of the present disclosure.

In some embodiments, as shown in FIG. 9, the apparatus 800 further includes a processing module 802. The processing module 802 may be configured to determine a type of a second network device in response to a measurement report received from a terminal, wherein the terminal is to perform a handover to the second network device.

In some embodiments, the processing module 802 may be further configured to determine the type of the second network device according to the type information sent by the terminal, where the type information indicates the type of the second network device.

In some embodiments, the processing module 802 may be further configured to determine the type of the second network device according to the type information sent by an OAM network element, where the type information indicates the type of the second network device.

In some embodiments, the processing module 802 may be further configured to determine the type of the second network device according to the type information sent by the second network device, where the type information indicates the type of the second network device.

In some embodiments, the second network device sends the type information to the first network device by at least one of: an X2 Setup Request signalling; an X2 Setup Response signalling; an XN Setup Request signalling; an XN Setup Response signalling, or a handover request acknowledgement message.

In some embodiments, the transceiving module 801 may be further configured to send the control information to the terminal through a radio resource control (RRC) connection reconfiguration signalling; or to send the control information to the terminal through an RRC reconfiguration signalling; or to send the control information to the terminal through a mobility control signalling.

Figure 10:
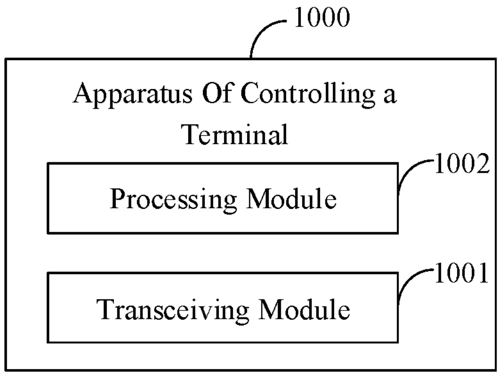
FIG. 10 is a structural schematic diagram illustrating an apparatus for controlling a terminal according to an embodiment of the present disclosure.

FIG. 10 is a structural schematic diagram illustrating an apparatus 1000 of controlling a terminal according to an embodiment of the present disclosure. The apparatus may be applied to a terminal.

As shown in FIG. 10, the apparatus 1000 comprises a transceiving module 1001 and a processing module 1002.

The transceiving module 1001 may be configured to receive control information sent by a first network device, where the first network device is a network device that currently provides services to the terminal, and the control information indicates a control action corresponding to a type of a second device to which the terminal is to perform a handover.

The processing module 1002 may be configured to perform a handover to the terminal to the second network device and perform the control action based on the control information.

Based on the apparatus of controlling a terminal according to an embodiment of the present disclosure, the terminal receives the control information from the first network device that currently provides services for the terminal, wherein the control information indicates the control action corresponding to the type of the second network device to which the terminal is to perform a handover. The terminal performs a handover to the second network device and performs the control action based on the control information. Therefore, according to the control information that indicates the control action corresponding to the type of the network device to which the terminal is to perform a handover, the terminal can perform the control action corresponding to the type, thereby realizing control of the terminal.

In some embodiments, the transceiving module 1001 may be further configured to send type information to the first network device, where the type information indicates the type of the second network device.

In some embodiments, the terminal receives the control information to the first network device by at least one of: a radio resource control (RRC) connection reconfiguration signalling; an RRC reconfiguration signalling; or a mobility control signalling.

Figure 11:
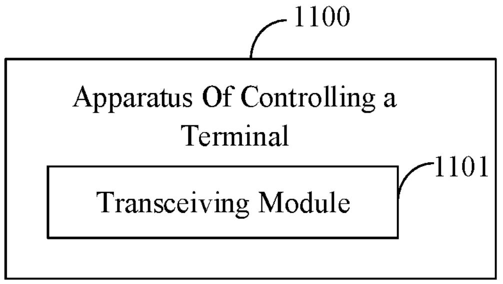
FIG. 11 is a structural schematic diagram illustrating an apparatus for controlling a terminal according to an embodiment of the present disclosure.

FIG. 11 is a structural schematic diagram illustrating an apparatus 1100 of controlling a terminal according to an embodiment of the present disclosure. The apparatus may be applied to a second network device to which a terminal is to perform a handover.

As shown in FIG. 11, the apparatus may comprise a transceiving module 1101, the transceiving module 1101 may be configured to send a type information to a first network device, where the first network device is a network device that currently provides services to the terminal, and the type information indicates a type of the second network device.

According to the apparatus of controlling a terminal in an embodiment of the present disclosure, the second network device may send information about its type to the first network device, so that the first network device can determine the type of the second network device when needed, thereby realizing control of the terminal based on the type of the second network device.

In some embodiments, the second network device sends the type information to the first network device by at least one of: an X2 Setup Request signalling; an X2 Setup Response signalling; an XN Setup Request signalling; an XN Setup Response signalling; or a handover request acknowledgement message.

Figure 12:
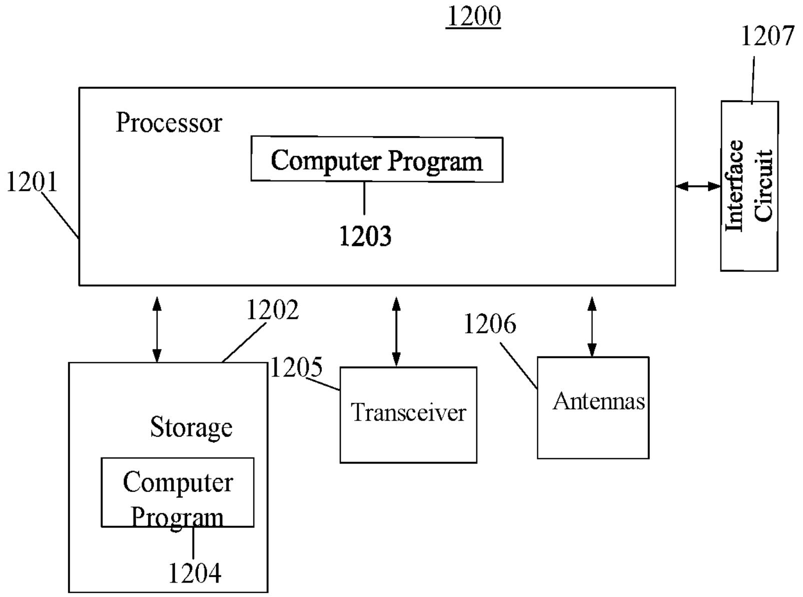
FIG. 12 is a structural schematic diagram illustrating a communication device according to an embodiment of the present disclosure.

Referring to FIG. 12, FIG. 12 is a structural schematic diagram illustrating a communication device 1200 according to an embodiment of the present disclosure. The communication device 1200 may be a network device, a terminal, or may be a chip, a chip system, a processor or the like that supports the network device or the terminal to implement the above methods. The device may be configured to implement the methods described in the above embodiments of methods. Reference can be made to the explanation in the above embodiments of methods for specific details.

The communication device 1200 may include one or more processors 1201. The processor 1201 may be a general-purpose processor, a dedicated processor, or the like, for example, a baseband processor or a central processor. The baseband processor may be used to process communication protocols and communication data. The central processor may be used to control a communication device (e.g., a base station, a baseband chip, a terminal, a chip of a terminal, DU or CU, etc.), and execute a computer program, and process data of the computer program.

In some examples, the communication device 1200 may include one or more storages 1202 on which a computer program 1204 may be stored. The processor 1201 executes the computer program 1204 so that the communication device 1200 performs the methods described in the above embodiments of methods. In some examples, the storage 1202 may store data. The communication device 1200 and the storage 1202 may be set separately or integrated together.

In some examples, the communication device 1200 may further include a transceiver 1205, antennas 1206. The transceiver 1205 may be referred to as a transceiving unit, a transceiver, a transceiver circuit, or the like and is configured to implement a transceiving function. The transceiver 1205 may include a receiver and a transmitter, wherein the receiver may be referred to as a receiver or a receiver circuit or the like and is configured to implement a receiving function; the transmitter may be referred to as a transmitter or a transmitter circuit and is configured to implement a sending function.

In some examples, one or more interface circuits 1207 may be included in the communication device 1200. The interface circuit 1207 is configured to receive code instructions and transmit them to the processor 1201. The processor 1201 executes the code instructions to cause the communication device 1200 to perform the methods described in the above method embodiments.

The communication device 1200 is a terminal. The processor 1201 is configured to perform step S502 in FIG. 5 and step S603 in FIG. 6; and the transceiver 1205 is configured to perform step S501 in FIG. 5 and steps S601-S602 in FIG. 6.

The communication device 1200 is a network device. The processor 1201 is configured to perform step S301 in FIG. 3 and step S401 in FIG. 4; and the transceiver 1205 is configured to perform step S201 in FIG. 2, step S302 in FIG. 3, step S402 in FIG. 4, and step S701 in FIG. 7.

In one implementation, the processor 1201 may include a transceiver for implementing receiving and transmitting functions. For example, the transceiver may be a transceiving circuit, or an interface, or an interface circuit. Transceiving circuits, interfaces, or interface circuits configured to perform receiving and transmitting functions may be separate or integrated together. The above transceiving circuit, interface, or interface circuit may be configured to read and write code/data. Or the above transceiving circuit, interface or interface, circuit may be configured to transmit or transfer signals.

In one implementation, the processor 1201 may store a computer program 1203. The computer program 1203 runs on the processor 1201, so as to make the communication device 1200 perform the methods described in the method embodiments above. The computer program 1203 may be embedded in the processor 1201, in which case the processor 1201 may be implemented as hardware.

In one implementation, the communication device 1200 may include a circuit that may implement the sending, receiving, or communicating functions in the foregoing method embodiments. The processor and the transceiver described in this application may be implemented as an integrated circuit (IC), an analog IC, a radio frequency integrated circuit (RFIC), a mixed-signal IC, an application specific integrated circuit (ASIC), a printed circuit board (PCB), an electronic device, and the like. The processor and the transceiver may further be fabricated using various IC process technologies such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), and the like.

The communication device described in the above embodiments may be a network device or a terminal (such as the first terminal in the foregoing method embodiments), but the scope of the communication device described in this application is not limited to these, and the structure of the communication device may not be limited by FIG. 12. The communication device may be an independent device or may be part of a device of a larger scale. For example, the communication device may be:

(1) an independent integrated circuit IC, a chip, a chip system or a chip subsystem;

(2) a set of one or more ICs, which may optionally include a storage component for storing data, a computer program;

(3) an ASIC, such as a Modem;

(4) a module that can be embedded in other devices;

(5) a receiver, a terminal, an intelligent terminal, a cellular phone, a wireless device, a handset, a mobile unit, a vehicle-mounted device, a network device, a cloud device, an artificial intelligence device, etc.;

(6) others, etc.

Figure 13:
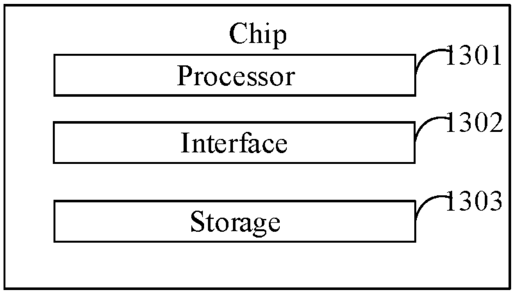
FIG. 13 is a structural schematic diagram illustrating a chip according to an embodiment of the present disclosure.

For a case that the communication device may be a chip or a chip system, the schematic diagram of a structure of a chip shown in FIG. 13 may be referred to. The chip shown in FIG. 13 includes a processor 1301 and an interface 1302, where the number of the processor 1301 may be one or more, and the number of the interface 1302 may be plural.

For a case where a chip is configured to implement the functions of the terminal in the embodiments of the present application, the processor 1301 is configured to perform step S502 in FIG. 5 and step S603 in FIG. 6, and the interface 1302 is configured to perform step S501 in FIG. 5 and steps S601-S602 in FIG. 6.

For a case where a chip is configured to implement the functions of the network device in the embodiments of the present application, the processor 1301 is configured to perform step S301 in FIG. 3 and step S401 in FIG. 4, and the interface 1302 is configured to perform step S201 in FIG. 2, step S302 in FIG. 3, step S402 in FIG. 4, and S701 in FIG. 7.

In some examples, the chip further includes a storage 1303 for storing necessary computer programs and data.

Those skilled in the art will further understand that the various illustrative logical blocks and steps described in the embodiments of the present application may be implemented as an electronic hardware, a computer software, or a combination of both. Whether such function is implemented as a hardware or a software depends on the particular application and overall system design requirements. Those skilled in the art may use various methods to implement the described functions for each particular application, but such implementations should not be deemed as exceeding the scope of the embodiments of the present application.

An embodiment of the present application further provides a system for determining a serving cell. The system includes a communication device serving as a terminal in the embodiment of FIG. 12 and a communication device serving as a network device in the embodiment of FIG. 13. Or the system includes a communication device serving as a terminal in the embodiment of FIG. 13 and a communication device serving as a network device in the embodiment of FIG. 13.

The present application further provides a readable storage medium on which instructions are stored, and when the instructions are executed by a computer, the functions of any of the above method embodiments are implemented.

The present application further provides a computer program product that implements the functions of any of the above method embodiments when executed by a computer.

The above embodiment may be implemented fully or partially as a software, a hardware, a firmware, or any combination thereof. When implemented as a software, it can be fully or partially implemented in a form of a computer program product. The computer program product includes one or more computer programs. When loading and executing the computer program on the computer, all or part of processes or functions described in the embodiments of the present application are generated. The computer may be a general-purpose computer, a dedicated computer, a computer network, or other programmable devices. The computer program may be stored in a computer-readable storage medium or transmitted from a computer-readable storage medium to another computer-readable storage medium. For example, the computer program may be transmitted from a web site, a computer, a server, or a data center to another web site, another computer, another server, or another data center via a wired (e.g., coaxial cable, optical fibre, digital subscriber line, DSL) or wireless (e.g., infrared, wireless, microwave, etc.) technology. The computer-readable storage medium may be any available medium that can be accessed by a computer or a data storage device, such as a server or data center, or the like, that may be integrated by one or more available media. The available media may be magnetic media (e.g., floppy disks, hard disks, magnetic tapes), optical media (e.g., digital video disks (DVD)), or semiconductor media (such as solid state disks (SSDs)), etc.

In some examples, there is provided a method of controlling a terminal, which is performed by a first network device, wherein the first network device is a network device that currently provides services to the terminal. The method comprises: in response to receiving a handover request acknowledgement message from a second network device, sending control information to the terminal to control the terminal, where the control information indicates a control action corresponding to a type of the second network device.

In some examples, before sending the control information to the terminal, the method further comprises determining the type of the second network device in response to a measurement report received from the terminal.

In some examples, the determining the type of the second network device comprises determining the type of the second network device according to type information sent by the terminal, wherein the type information indicates the type of the second network device.

In some examples, the determining the type of the second network device comprises determining the type of the second network device according to type information sent by an operations administration and maintenance (OAM) network element, wherein the type information indicates the type of the second network device.

In some examples, the determining the type of the second network device comprises determining the type of the second network device according to type information sent by the second network device, wherein the type information indicates the type of the second network device.

In some examples, the type information being sent by the second network device to the first network device by at least one of: an X2 Setup Request signalling; an X2 Setup Response signalling; an XN Setup Request signalling; an XN Setup Response signalling; or a handover request acknowledgement message.

In some examples, the sending the control information to the terminal comprises: sending the control information to the terminal through a radio resource control (RRC) connection reconfiguration signalling; or sending the control information to the terminal through an RRC reconfiguration signalling; or sending the control information to the terminal through a mobility control signalling.

In some examples, a method of controlling a terminal is provided, which is performed by a terminal and comprises: receiving control information sent by a first network device, wherein the first network device is a network device that currently provides services for the terminal, and the control information indicates a control action corresponding to a type of a second network device to which the terminal is to perform a handover, and based on the control information, performing a handover to the second network device and performing the control action.

In some examples, the method further comprises sending type information to the first network device, wherein the type information indicates a type of the second network device.

In some examples, the terminal receives the control information from the first network device by at least one of: a radio resource control (RRC) connection reconfiguration signalling; an RRC reconfiguration signalling; or a mobility control signalling.

In some examples, the second network device sends the type information to the first network device by at least one of: an X2 Setup Request signalling; an X2 Setup Response signalling; an XN Setup Request signalling; an XN Setup Response signalling; or a handover request acknowledgement message.

In some examples, an apparatus for controlling a terminal is provided, which is applied to a first network device, wherein the first network device is a network device that currently provides services for the terminal, and the apparatus comprises a transceiving module, which is configured to in response to a handover request acknowledgement message received from a second network device, send control information to the terminal to control the terminal, wherein the control information indicates a control action corresponding to a type of the second network device.

In some examples, an apparatus for controlling a terminal is provided, which is applied to the terminal and comprises: a transceiving module, which is configured to receive control information sent by a first network device, wherein the first network device is a network device that currently provides services for the terminal, and the control information indicates a control action corresponding to a type of a second network device to which the terminal is to perform a handover; and a processing module, which is configured to perform a handover to the second network device and perform the control action based on the control information.

In some examples, an apparatus for controlling a terminal is provided, which is applied to a second network device to which the terminal is to perform a handover and comprises: a transceiving module, which is configured to send type information to a first network device, wherein the first network device is a network device that currently provides services for the terminal and the type information indicates a type of the second network device.

In some examples, there is provided a communication device which comprises a transceiver, a storage, and a processor. The processor is connected to the transceiver and the storage respectively, and is configured to control transceiving of wireless signals by the transceiver through executing computer-executable instructions stored in the storage, so as to implement the method according to the examples.

In some examples, there is provided a non-transitory computer storage medium, wherein the computer storage medium stores computer-executable instructions, and the computer-executable instructions are executed by a processor to implement the method according to the examples.

In some examples, a method and an apparatus of controlling a terminal are provided. After the first network device currently providing services to the terminal receives a handover request acknowledgement message from the second network device, the first network device sends control information indicating a control action corresponding to a type of the second network device to the terminal, so as to control the terminal. Therefore, by sending the control information to the terminal based on a type of a network device to which the terminal is to perform a handover, it can instruct the terminal to perform a control action corresponding to the type, thereby realizing control of the terminal.

Those of ordinary skill in the art can understand that the first, second and other numbers referred to in the present application are for convenience of description and differentiation only, but are not used to limit the scope of the embodiments of the present application. Or they may represent the sequence.

The “at least one” in this application may also be described as “one or more”. And “more” may be two, three, four, or more, which is not limited in this application. In the embodiments of the present application, for a technical feature, technical characteristics of the technical feature are distinguished by “first”, “second”, “third”, “A”, “B”, “C” and “D”, etc. The technical characteristics described by “first”, “second”, “third”, “A”, “B”, “C” and “D” are not in order of precedence or size.

As used herein, terms “machine-readable medium” and “computer-readable medium” refer to any computer program product, device, and/or apparatus (e.g., a magnetic disc, an optical disk, a storage, a programmable logic device (PLDs)) configured to provide machine instructions and/or data to a programmable processor, including a machine-readable medium that receives machine instructions as a machine-readable signal. The term “machine-readable signal” refers to any signal configured to provide machine instructions and/or data to a programmable processor.

The systems and techniques described herein may be implemented as a computing system that includes a back-end component (e.g., a data server), or a computing system that includes a middleware component (e.g., an application server), or a computing system that includes a front-end component (e.g., a user computer with a graphical user interface or a web browser, wherein the user can interact with implementations of the systems and techniques described herein through the graphical user interface or the web browser), or a computing system that contains any combination of a back-end, a middleware, or a front-end component. The components of the system can be interconnected by any form or medium of digital data communications (e.g., a communication network). Examples of communication networks include local area networks (LANs), wide area networks (WANs), and the Internet.

A computer system may include a client and a server. The client and the server are generally remote from each other and typically interact through a communication network. The relationship of client and server is generated by virtue of computer programs that have a client-server relationship to each other running on the corresponding computers.

It should be understood that steps may be reordered, added, or deleted using various forms of processes shown above. For example, the steps described in the present disclosure may be performed in parallel, sequentially, or in different orders, and there is no limitation herein as long as the desired result of the technical solution disclosed in the present disclosure can be achieved.

Moreover, it should be understood that the various embodiments described herein can be implemented individually or in combination with other embodiments, as long as it is allowed by the solution.

Those of ordinary skill in the art may realize that the units and algorithm steps of the examples described in the embodiments disclosed herein can be implemented as an electronic hardware or a combination of a computer software and an electronic hardware. Whether these functions are implemented as hardware or software depends on the specific application and design constraints of the technical solution. Those skilled in the art may implement the described function using different methods for each particular application, but such implementations should not be considered beyond the scope of this application.

Those skilled in the art can clearly understand that, for convenience and conciseness of description, the specific working processes of the systems, devices and units described above can be referred to the corresponding processes in the foregoing method embodiments, and are not described here.

The above descriptions are only specific embodiments of the present application, but the scope of protection of the present application is not limited thereto. Any changes or substitutions, easily conceived by the person skilled in the art based on the disclosure of the present application, shall be covered by the scope of protection of the present application. Therefore, the scope of protection of this application shall be subject to the scope of protection of the claims.

The invention claimed is:

1. A method of controlling a terminal, performed by a first network device, wherein the first network device is a network device that currently provides services to the terminal, the method comprising:

sending control information to the terminal to control the terminal in response to a handover request acknowledgement message received from a second network device, wherein the control information indicates a control action corresponding to a type of the second network device, the type of the second network device comprises a base station requiring to mute a device and a base station allowing a device to broadcast sound, and the control action comprises at least one of: muting, unmuting, switching to a vibration mode, or turning on a sound broadcasting mode.

2. The method according to claim 1, wherein before sending the control information to the terminal, the method further comprises:

determining the type of the second network device in response to a measurement report received from the terminal.

3. The method according to claim 2, wherein the determining the type of the second network device comprises:

determining the type of the second network device according to type information sent by the terminal, wherein the type information indicates the type of the second network device.

4. The method according to claim 2, wherein the determining the type of the second network device comprises:

determining the type of the second network device according to type information sent by an operations administration and maintenance (OAM) network element, wherein the type information indicates the type of the second network device.

5. The method according to claim 2, wherein the determining the type of the second network device comprises:

determining the type of the second network device according to type information sent by the second network device, wherein the type information indicates the type of the second network device.

6. The method according to claim 5, wherein the type information being sent by the second network device to the first network device by at least one of:

an X2 Setup Request signalling;

an X2 Setup Response signalling;

an XN Setup Request signalling;

an XN Setup Response signalling; or a handover request acknowledgement message.

7. The method according to claim 1, wherein the sending the control information to the terminal comprises:

sending the control information to the terminal through a radio resource control (RRC) connection reconfiguration signalling; or sending the control information to the terminal through an RRC reconfiguration signalling; or sending the control information to the terminal through a mobility control signalling.

8. A communication device comprising a transceiver, a storage, and a processor, wherein the processor is connected to the transceiver and the storage respectively, and is configured to control transceiving of wireless signals by the transceiver through executing computer-executable instructions stored in the storage, so as to implement the method according to claim 1.

9. A non-transitory computer storage medium that stores computer-executable instructions, and the computer-executable instructions when executed by one or more processors cause the one or more processors to collectively execute the method according to claim 1.

10. A method of controlling a terminal, performed by the terminal and comprising:

receiving control information sent by a first network device, wherein the first network device is a network device that currently provides services for the terminal, and the control information indicates a control action corresponding to a type of a second network device to which the terminal is to perform a handover, the type of the second network device comprises a base station requiring to mute a device and a base station allowing a device to broadcast sound, and the control action comprises at least one of: muting, unmuting, switching to a vibration mode, or turning on a sound broadcasting mode; and performing a handover to the second network device and performing the control action based on the control information.

11. The method according to claim 10, wherein the method further comprises:

sending type information to the first network device, wherein the type information indicates the type of the second network device.

12. The method according to claim 10, wherein the terminal receives the control information from the first network device by at least one of:

a radio resource control (RRC) connection reconfiguration signalling;

an RRC reconfiguration signalling; or a mobility control signalling.

13. A method of controlling a terminal, performed by a second network device to which the terminal is to perform a handover and comprising:

sending type information to a first network device, wherein the first network device is a network device that currently provides services for the terminal, and the type information indicates a type of the second network device, the type of the second network device comprises a base station requiring to mute a device and a base station allowing a device to broadcast sound, and the control action comprises at least one of: muting, unmuting, switching to a vibration mode, or turning on a sound broadcasting mode.

14. The method according to claim 13, wherein the second network device sends the type information to the first network device by at least one of:

an X2 Setup Request signalling;

an X2 Setup Response signalling;

an XN Setup Request signalling;

an XN Setup Response signalling; or a handover request acknowledgement message.

15. A communication device comprising a transceiver, a storage, and a processor, wherein the processor is connected to the transceiver and the storage respectively, and is configured to control transceiving of wireless signals by the transceiver through executing computer-executable instructions stored in the storage, so as to implement the method according to claim 10.

16. A communication device comprising a transceiver, a storage, and a processor, wherein the processor is connected to the transceiver and the storage respectively, and is configured to control transceiving of wireless signals by the transceiver through executing computer-executable instructions stored in the storage, so as to implement the method according to claim 13.

17. A non-transitory computer storage medium that stores computer-executable instructions, and the computer-executable instructions when executed by one or more processor to collectively execute the method according to claim 10.

18. A non-transitory computer storage medium that stores computer-executable instructions, and the computer-executable instructions when executed by one or more processors cause the one or more processors to collectively execute the method according to claim 13.

* * * * *